US012767203B1

(12) United States Patent
Zhang et al.

(10) Patent No.: US 12,767,203 B1
(45) Date of Patent: Oct. 20, 2026

(54) GARDEN CART

(71) Applicant: Shenzhen Zhixiao Technology Co., LTD, Shenzhen (CN)

(72) Inventors: Yingbo Zhang, Shenzhen (CN); Jinlin Zhuang, Shenzhen (CN)

(73) Assignee: Shenzhen Zhixiao Technology Co., LTD, Shenzhen (CN)

( * ) Notice: Subject to any disclaimer, the term of this patent is extended or adjusted under 35 U.S.C. 154(b) by 0 days.

(21) Appl. No.: 18/985,260

(22) Filed: Dec. 18, 2024

(30) Foreign Application Priority Data

Apr. 30, 2024 (CN) ......................... 202420935401.5

(51) Int. Cl.
*B62B 5/08* (2006.01)
*B62B 5/06* (2006.01)

(52) U.S. Cl.
CPC .............. *B62B 5/085* (2013.01); *B62B 5/065* (2013.01)

(58) Field of Classification Search
CPC ... B62B 5/085; B62B 5/065; B62B 2206/006; B62B 3/02; B62B 1/208
See application file for complete search history.

(56) References Cited

U.S. PATENT DOCUMENTS 4,460,188 A * 7/1984 Maloof ..................... B62B 1/20 297/188.1
4,763,907 A * 8/1988 Raymond ................. B62B 3/02 280/47.38
5,876,049 A * 3/1999 Spear ........................ B62B 3/16 280/87.01
6,520,513 B2 * 2/2003 Presley-Mays ........ A47C 9/027 280/47.35
6,758,482 B2 * 7/2004 Stallbaumer ............ B62B 1/002 280/47.27
7,210,545 B1 * 5/2007 Waid ......................... B62B 3/12 180/19.1
7,762,363 B1 * 7/2010 Hirschfeld ............... B60K 1/04 280/651
7,963,531 B2 * 6/2011 Panigot ................... B62B 1/208 280/38
8,191,907 B2 * 6/2012 Watson ................... B62B 3/007 280/30

(Continued)

OTHER PUBLICATIONS

Flinter Rolling Garden Work Seat with Wheels[online], Flinter, Product first date available Apr. 21, 2024, URL: https://www.amazon.com/gp/product/B0D2CXFTSD?th=1, Yingbo Zhang et al.

*Primary Examiner* — Valentin Neacsu
*Assistant Examiner* — Michael R Stabley
(74) *Attorney, Agent, or Firm* — Hemisphere Law, PLLC

(57) ABSTRACT

A garden cart comprising: a frame provided with a storage space; a seat portion, comprising a first end rotatably connected to the frame and a second end opposite to the first end; the seat portion rotating to cover the storage space, and a top side of the seat portion defining a seat surface; a handle portion connected to the second end of the seat portion; and at least two wheels rotatably installed on bottom of the frame and configured to drive the garden cart to move; wherein the garden cart is capable of moving in the garden, and being operating in a pushing state that the seat portion covers the storage space and the handle portion is applied with a pushing force to make the garden cart latterly moves along a direction from the second end to the first end.

6 Claims, 8 Drawing Sheets

100

(56) References Cited

U.S. PATENT DOCUMENTS

| | | | | |
|---|---|---|---|---|
| 8,453,771 | B1 * | 6/2013 | Hirschfeld | B60L 8/003 180/19.1 |
| 8,973,940 | B2 * | 3/2015 | Chen | B62B 3/02 280/638 |
| 9,327,749 | B2 * | 5/2016 | Young | B62B 5/08 |
| 9,333,977 | B2 * | 5/2016 | Herlitz | B62B 3/007 |
| 9,365,225 | B2 * | 6/2016 | Henao | B62B 3/002 |
| 10,988,153 | B1 * | 4/2021 | Horowitz | B62B 7/008 |
| 11,008,030 | B2 * | 5/2021 | Cohen | B62B 5/0083 |
| 11,400,965 | B2 * | 8/2022 | Panigot | B62B 5/067 |
| 11,760,399 | B2 * | 9/2023 | Bowman | B62B 3/02 280/651 |
| 2003/0025301 | A1 * | 2/2003 | Banuelos, III | B62B 3/022 280/47.38 |
| 2012/0119459 | A1 * | 5/2012 | Hanson | B62B 5/082 280/47.17 |

* cited by examiner

GARDEN CART

CROSS REFERENCE TO RELATED APPLICATIONS

This application claims the benefit of priority to Chinese Patent Application Number 202420935401.5 filed on Apr. 30, 2024, in the China National Intellectual Property Administration. The entire contents of the above-identified application are hereby incorporated by reference.

TECHNICAL FIELD

The present disclosure relates to the technical field of cart, in particular to a garden cart for gardening work.

BACKGROUND

In gardening work, gardeners often need to transport a large quantity of gardening tools and bend down or squat to perform gardening work, the physical demands on the gardeners is high. Therefore, it is necessary to provide a cart that is suitable for daily use by gardeners.

BRIEF DESCRIPTION OF DRAWINGS

Embodiments of the present disclosure will now be described, by way of embodiment, with reference to the attached figures. The structure, operation, and advantages of the present invention will become further apparent upon consideration of the following description taken in conjunction with the accompanying figures. The figures are intended to be illustrative, and not limiting.

DETAILED DESCRIPTION

Figure 1:
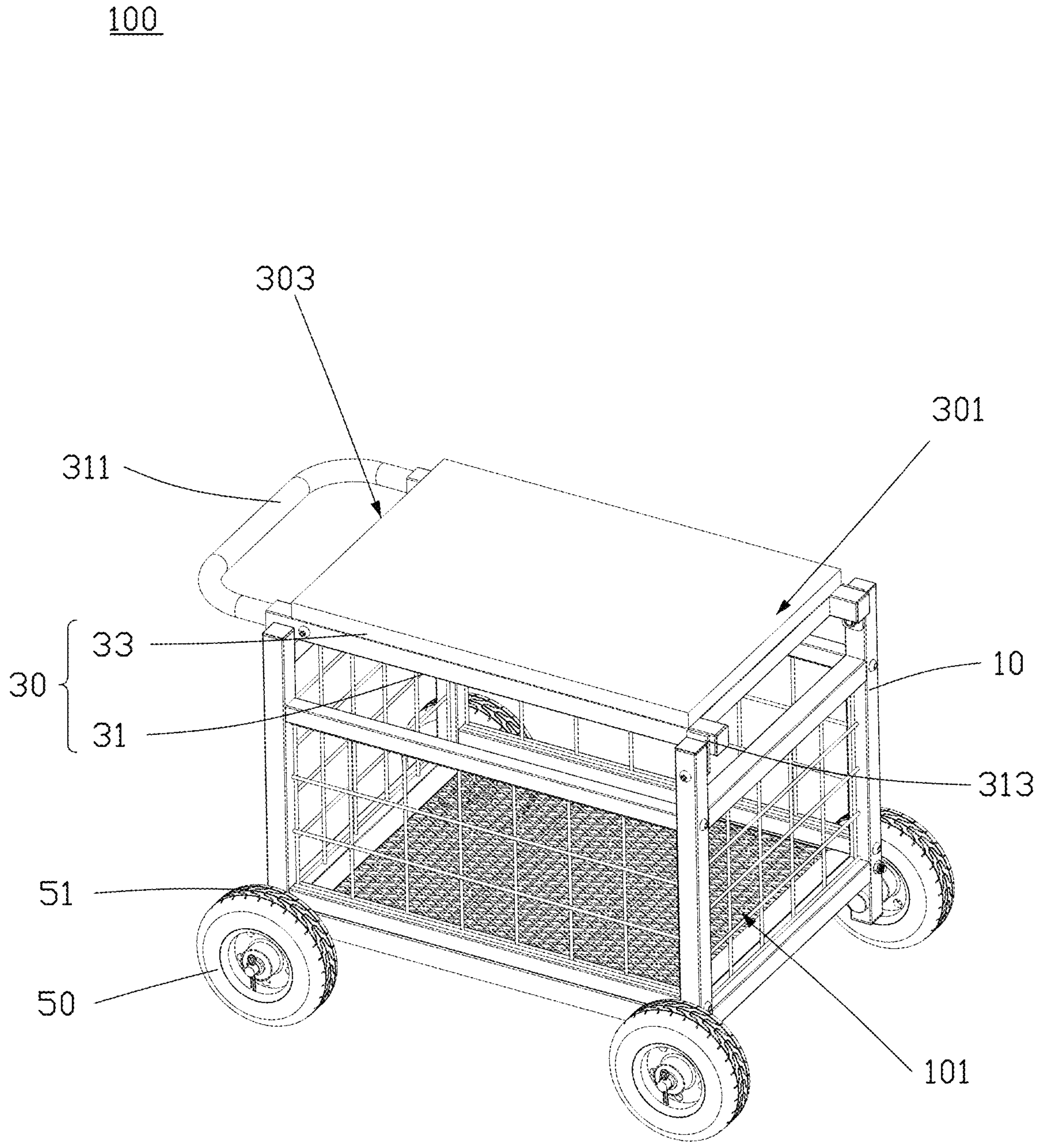
FIG. 1 is a perspective view of a garden cart of the present disclosure.

In the description that follows, numerous details are outlined to provide a thorough understanding of the present invention. It will be appreciated by those skilled in the art that variations of these specific details are possible while still achieving the results of the present invention.

Exemplary illustrative embodiments of the invention should be interpreted as example(s) and non-limiting. The relationship between various arms, where they are located, their composition(s), their operation and sometimes their sizes relative to the desired operation of the invention are significant.

Referring to FIG. 1 to FIG. 8, a garden cart 100 is configured to operate in gardening work, which is capable of storing or carrying gardening tools and also providing a seat function. The garden cart 100 includes a frame 10, a seat portion 30, a handle portion 311 and four wheels 50.

The seat portion 30 is provided with a first end 301 and a second end 303 opposite to each other. The first end 301 is rotatably connected to the frame 10. When the first end 301 rotates, an angle is defined between the second end 303 and the frame 10. The garden cart 100 moves by the external force of the users, the operation status of the garden cart 100 switches between a pushing state A and a pulling state B by changing the direction of external force applied to the first end 301.

Figure 6:
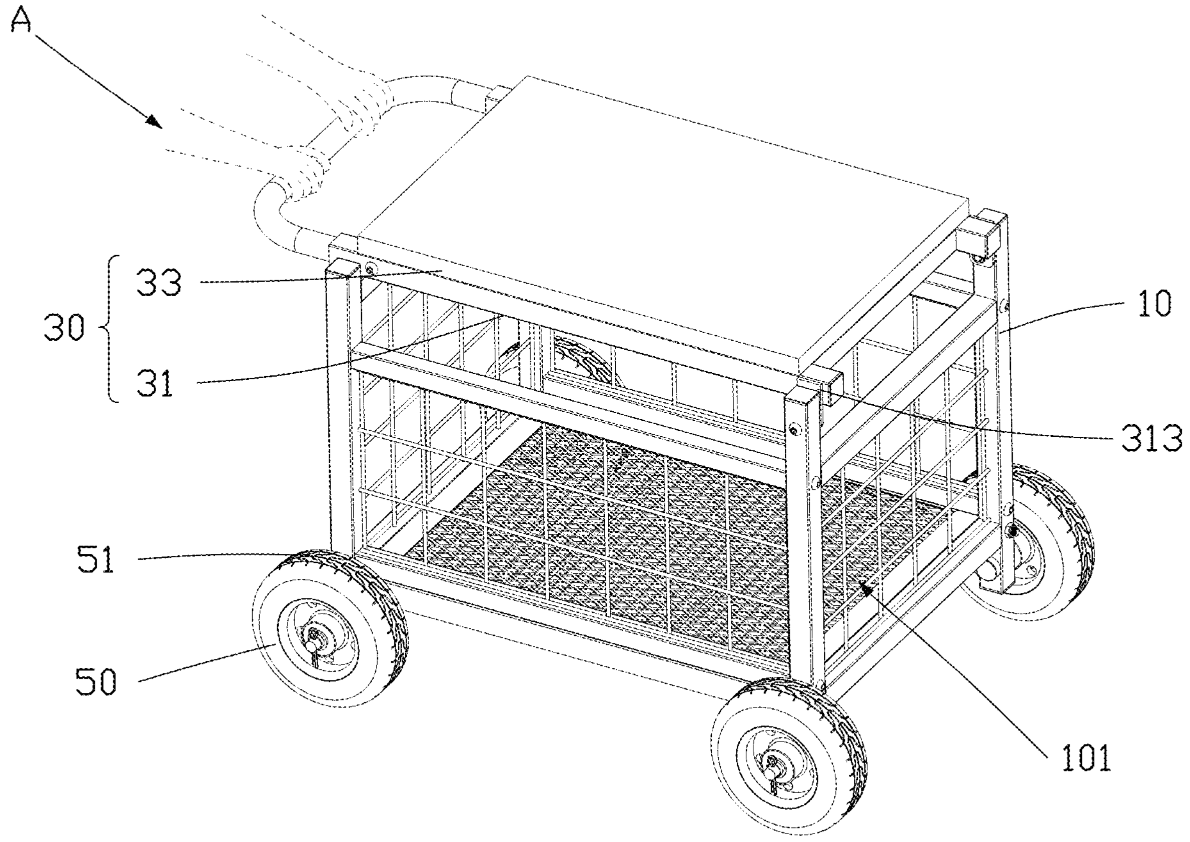
FIG. 6 is a schematic view of scenes illustrating a pushing state of the garden cart.
Figure 7:
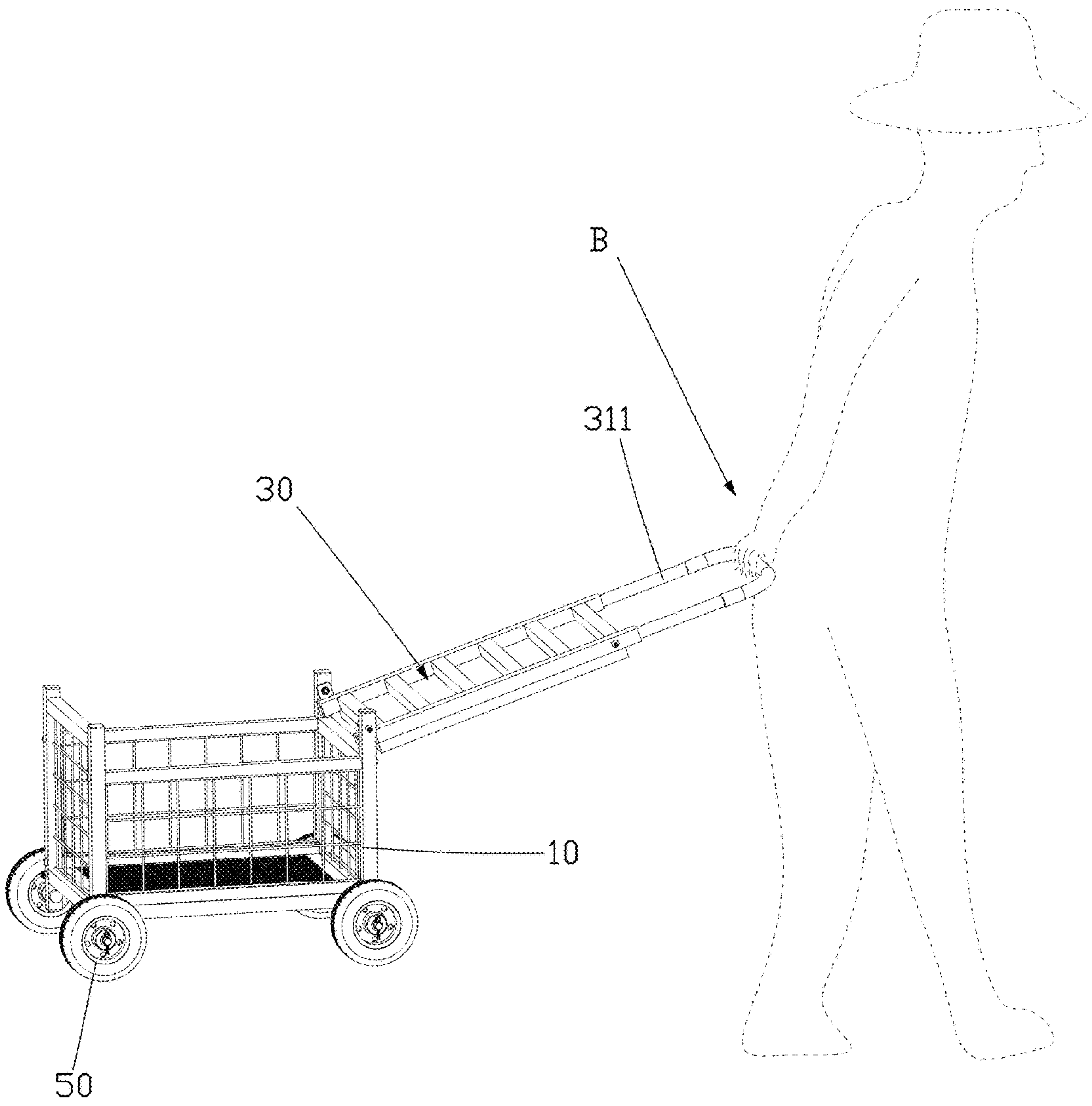
FIG. 7 is a schematic view of scenes illustrating a pulling state of the garden cart.

Referring to FIG. 6, in the pushing state A, the seat portion 30 serves as a cover for covering a storage space 101 and the first end 301 is located in a side of the frame away from the second end 302, so that the user is capable of pushing the garden cart 100. Moreover, referring to FIG. 8, the user is capable of sitting on the seat portion 30, and the garden cart 100 is driven by the toggle action of the user's feet to move laterally in the garden. Referring to FIG. 7, in the pulling state B, the first end 301 of the seat portion 30 rotates more than 90 degrees relative to the second end 302, so that the user is capable of pulling the first end 301 of the garden cart 100.

The seat portion 30 includes a seat frame 31 configured to support the seat portion 30 and a cushion 33 connected to the seat frame 31. The seat frame 31 is made of hard material, which can be selected from steel or aluminum alloy and so on. The cushion 33 is made of soft material, which can be sponge or silicone and so on. The seat frame 31 is provided with a plurality of slits arranged at intervals, and the cushion 33 is detachably instated on the seat frame 31. The cushion 33 is detachable with the seat frame, so that long-handled garden tools can be accommodated in the storage space by allowing long portions of these tools to protrude through the slits of the seat frame 31.

The handle portion 311 is connected to the second end 303 of the seat frame 31. In some exemplary embodiments of the present disclosure, the handle portion 311 is integrated with the seat frame 31. In some exemplary embodiments of the present disclosure, the handle portion 311 is telescopically and detachably mounted on the seat frame 31, the seat frame 31 includes an accommodating space, and therefore the handle portion 311 is retracted to be received in the accommodating space of the seat frame 31.

Figure 5:
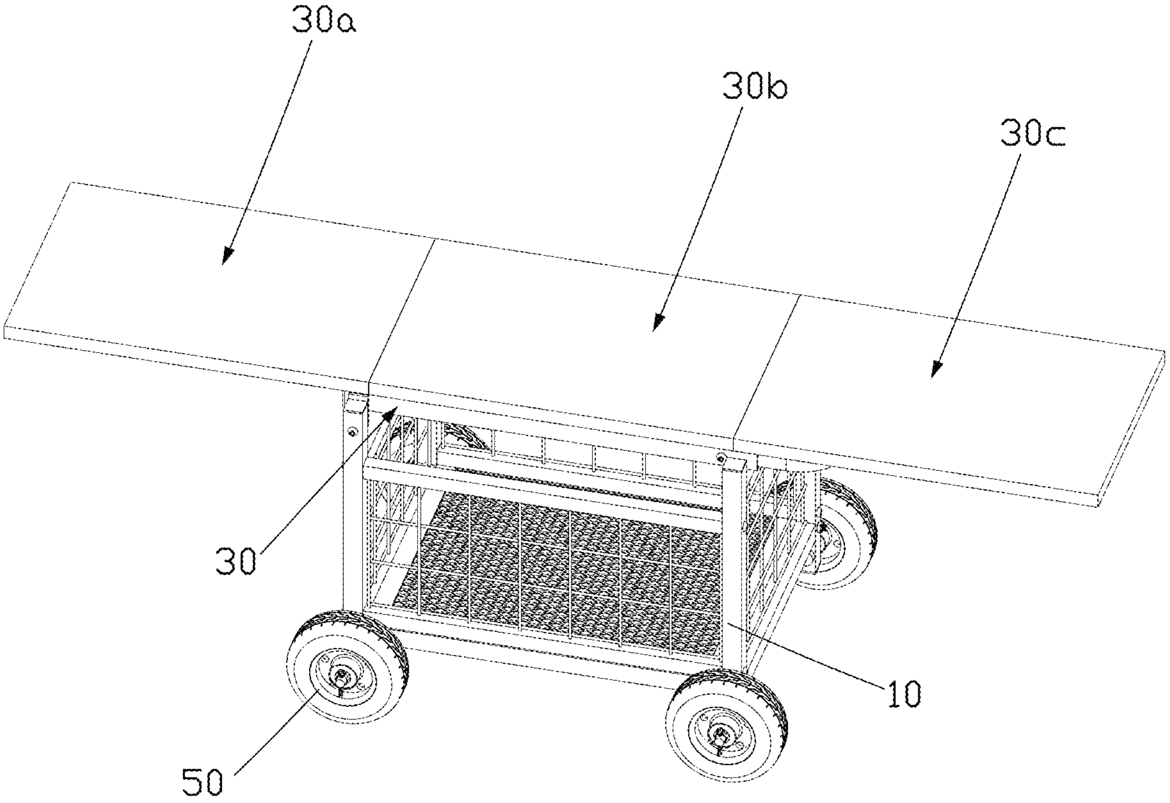
FIG. 5 is a schematic view of the garden cart in FIG. 1, wherein three work platforms of the garden cart are provided.

Referring to FIG. 5, in some exemplary embodiments of the present disclosure, the cushion 33 is a multi-layered foldable structure which includes a first layer 33*a*, a second layer 33*b* and a third layer 33*c*. In a foldable status, the third layer 33*c*, the first layer 33*a* and the second layer 33*b* are stacked one by one and arranged on the frame 10. The second layer 33*b* is detachably connected with the seat frame 31. In a non-foldable status, both the second layer 33*b* and the seat frame 31 cover the storage space of the garden cart 100, the first layer 33*a* and the third layer 33*c* are expanded and finally located in the same plane with the second layer 33*b*, so as to form a large operation platform. Moreover, the expanded layer, e.g. the third layer 33*c*, is supported by the handle portion 311.

Figure 2:
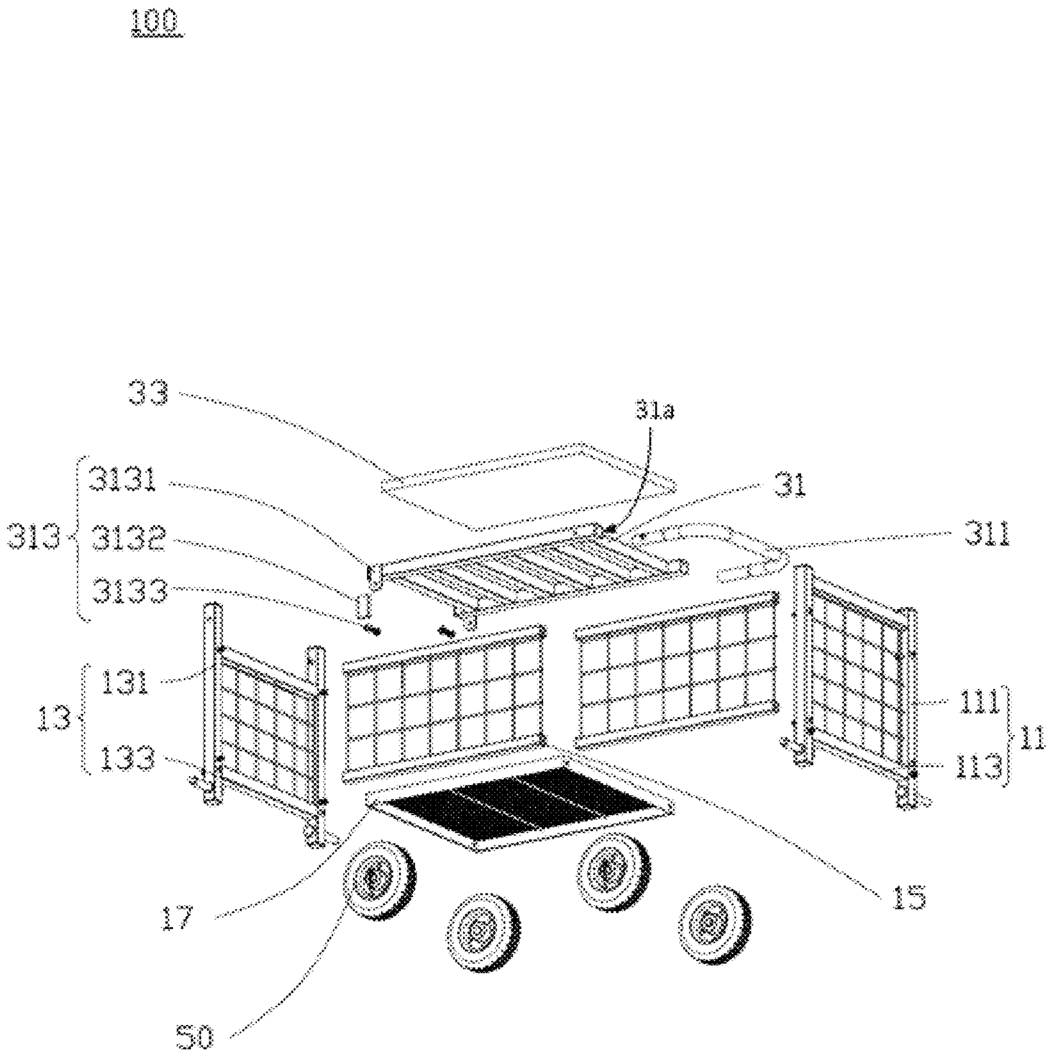
FIG. 2 is an exploded view of the garden cart in FIG. 1.
Figure 3:
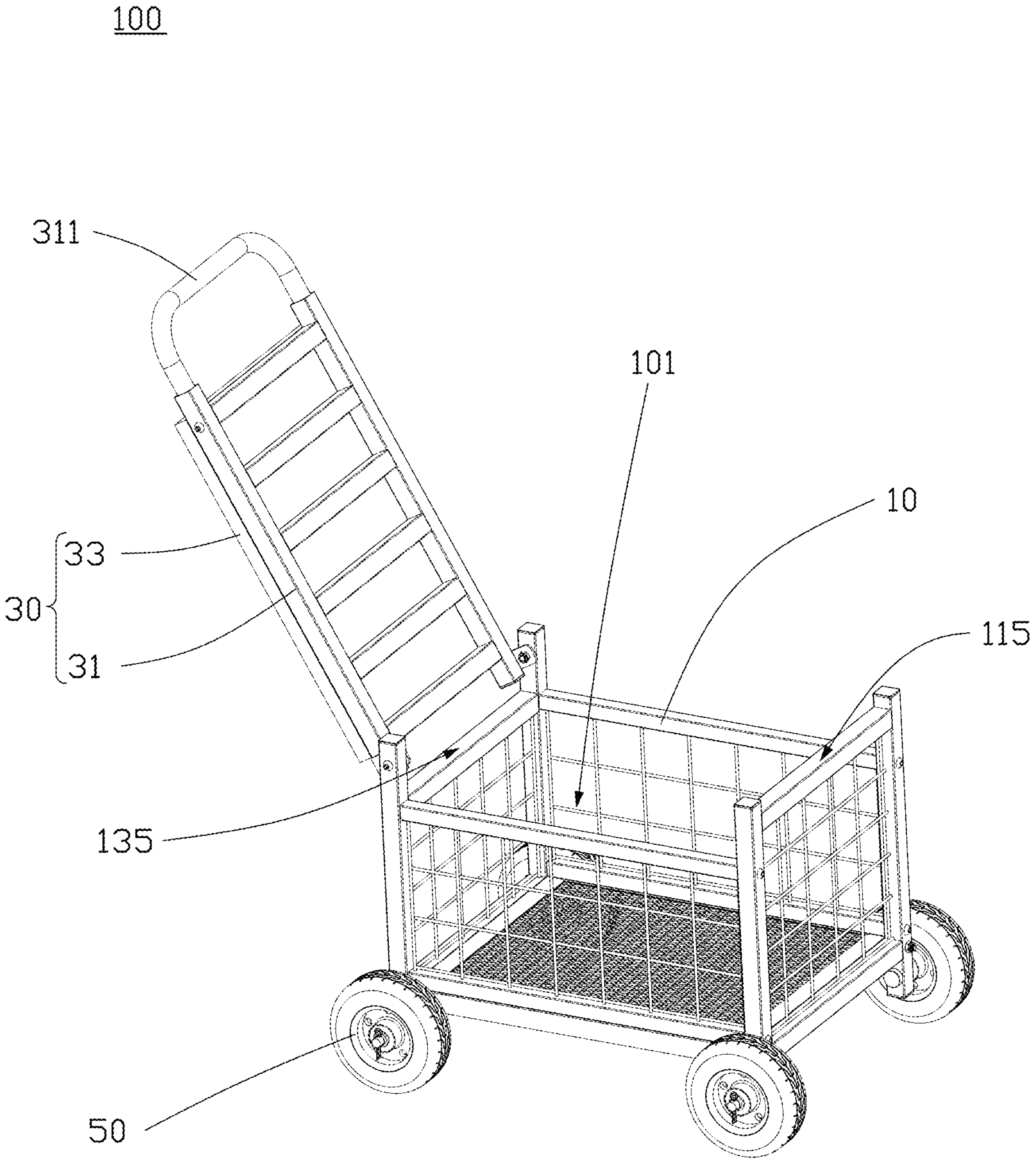
FIG. 3 is perspective view of the garden cart in FIG. 1, wherein an angle between a seat portion and a frame of the garden cart is illustrated.

Referring to FIG. 2-3, the frame 10 includes a bottom frame 17, a front frame 11 and a rear frame 13 connected to the front and rear sides of the bottom frame 17, and two side frames 15 connected to the left and right sides of the bottom frame 17. The front frame 11, the rear frame 13, and the side frames 15 are connected to form a storage space 101. The frame 10 is made of hard material, which can be steel or aluminum alloy and so on. The front frame 11, the rear frame 13, the two side frames 15 and the bottom frame 17 can be detached and separated from each other. Furthermore, they also can be assembled by screw elements, thereby reducing the packaging volume during transportation and saving transportation costs.

The front frame 11 comprises a pair of first vertical bars 111 perpendicular to the bottom frame 17 and disposed opposite to each other, and a pair of first horizontal bars 113 parallel to the bottom frame 17 and disposed opposite to each other. The two first vertical bars 111 are connected to the two ends of the first horizontal bars 113, and the top ends of the first vertical bars 111 protrude beyond the first horizontal bars 113, forming an engagement groove 115 between the top ends of the two first vertical bars 111. The second end 303 is received in the engagement groove 115 and engaged within the engagement groove 115, and the end of the seat portion 30 contacts the top surface of the engagement groove 115, thereby making the first horizontal bars 113 to support the seat portion 30. When the seat portion 30 is engaged within the engagement groove 115, the seat portion 30 and the first horizontal bars 113 are parallel to the bottom frame 17, such that the seat portion 30 is more comfortable for the user to sit and put tools.

The rear frame 13 comprises a pair of second vertical bars 131 perpendicular to the bottom frame 17 and disposed opposite to each other, and a pair of second horizontal bars 133 parallel to the bottom frame 17 and disposed opposite to each other. The two second vertical bars 131 are connected to the two ends of the second horizontal bars 133, and the top ends of the second vertical bars 131 protrude beyond the second horizontal bars 133, forming a rotation groove 135 between the top ends of the two second vertical bars 131. The first end 30 is received in the rotation groove 135 and rotatably connected to the two second vertical bars 131. The rotation groove 135 has enough space to facilitate the multi-angle rotation of the seat portion 30.

The end of the seat frame 31 connected to the rear frame 13 is provided with a connecting piece 313. The connecting piece 313 includes a connecting plate 3131 and a rotating shaft 3133. The side of seat frame 31 close to the frame 10 extends to form a connecting plate 3131. The connecting plate 3131 is perpendicular to the seat frame 31 and one end of the connecting plate 3131 contacts the frame 10. The rotating shaft 3133 passes through the frame 10 and the connecting plate 3131, and the connecting plate 3131 pivots around the rotating shaft 3133, thereby enabling the seat frame 31 to rotate with respect to the frame 10. A damping pad 3132 is arranged at the connection between the connecting plate 3131 and the seat frame 31 to increase the rotational friction between the connecting plate 3131 and the seat frame 31, so that the seat frame 31 can be suspended at any angle with respect to the frame 10.

Figure 4:
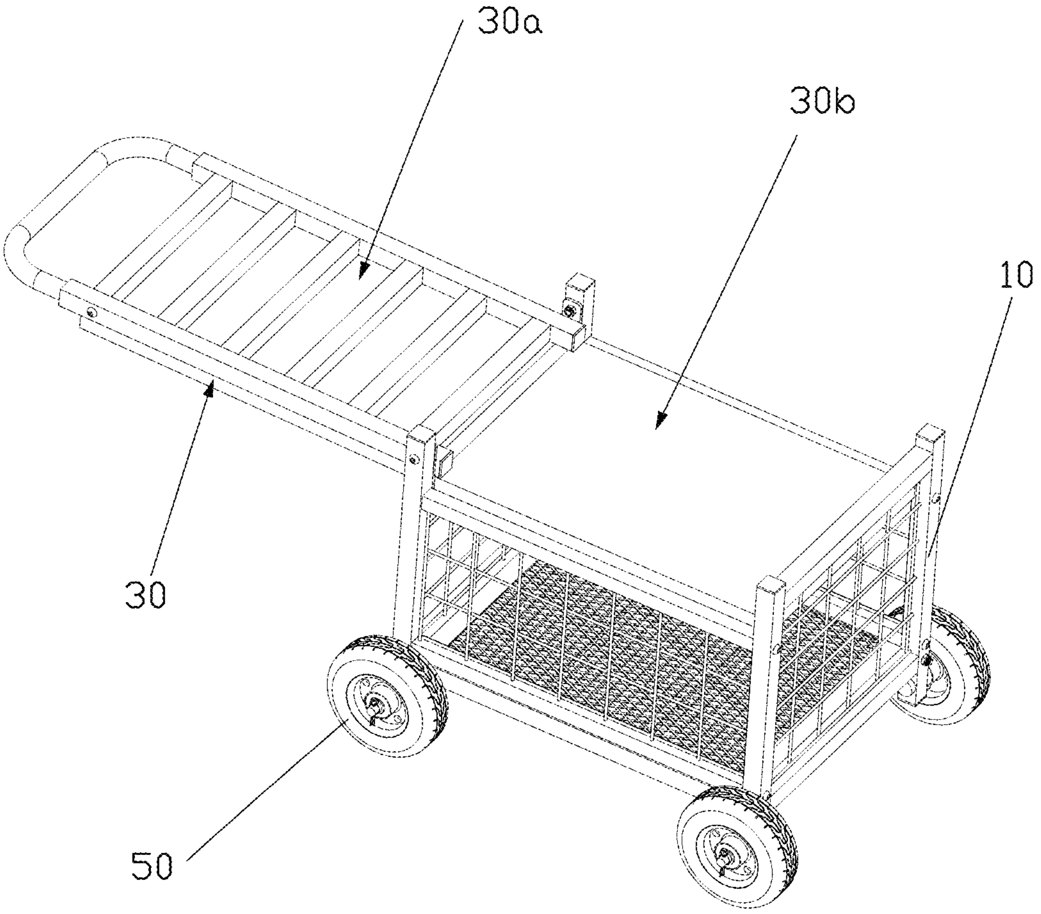
FIG. 4 is a schematic view of the garden cart in FIG. 1, wherein two work platforms of the garden cart are provided.

Referring to FIG. 4, in some exemplary embodiments of the present disclosure, the second layer 30*b* of the seat portion 30 is detachably provided to the garden cart 100. When the second layer 30*b* is assembled, the second layer 30*b* is located on the frame 10, and is supported by the two first horizontal bars 113. In such case, the first layer 30*a* rotates to 180 degrees with seat portion 30, and is located in the same plane with the second layer 30*b* to form an expanded operation flatform.

In this embodiment, the bottom ends of the two first vertical bars 111 and the two second vertical bars 131 protrude respectively below the first horizontal bars 113 and the second horizontal bars 133. The wheels 50 are connected to each of the first vertical bars 111 and second vertical bars 131. Each wheel 50 can be for example a one-way wheel for easier lateral movements, an anti-slip pattern 51 is provided to the wheel 50 to increase the friction between the wheel 50 and the ground or muddy terrain.

The wheels rotate along a direction and drive the garden cart to move in the direction. In gardening work, precise fertilization or pruning of plants in specific areas is required, the unidirectional wheels ensure that the garden cart 100 stays on a predetermined direction, thereby enhancing the accuracy and efficiency of the task.

Figure 8:
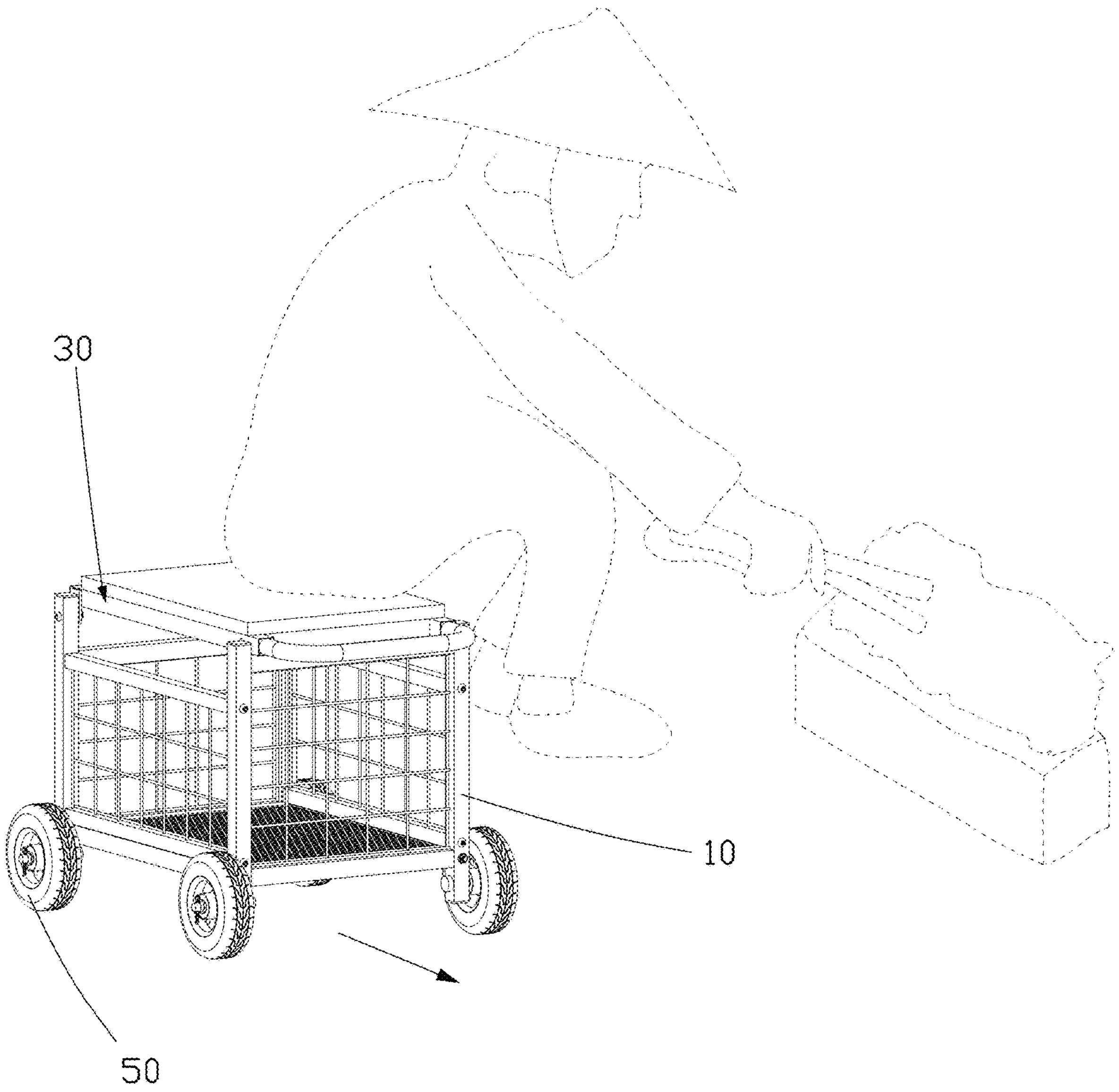
FIG. 8 is a schematic view of illustrating a working scenario wherein the garden cart is in a state for sitting for a gardener to perform gardening work.

Referring to FIG. 8, in an application embodiment, the garden cart is placed on the ground. A body of the user sits on the seat portion and the feet touching the ground, facing the work area such as flower beds or lawns, etc. The body applies push forces to drive the garden cart leftward and rightward to complete extensive gardening tasks. The height of the garden cart 100 can be no higher than a half of the height of the body, thereby facilitating ease of gardening work.

The garden cart 100 is capable of exerting both pushing and pulling forces to move, and provides a seat for the user to sit on during gardening work. The multi-layered cushion 30 can be flattened onto the same plane to form a large working platform for the user to place items, enhancing the user experience.

In the description of the present disclosure, it should be understood that terms such as "center", "longitudinal", "lateral", "length", "width", "thickness", "top", "bottom", "front", "rear", "left", "right", "vertical", "horizontal", "upper", "lower", "inner", "outer", "clockwise", "counter-clockwise", etc., indicate the orientation or positional relationship based on the orientation or positional relationship shown in the drawings. These terms are used for descriptive purposes and are not to be construed as limiting, indicating, or implying any particular orientation, construction or operation for the devices or arms referred to. Therefore, it should be understood that the terms "first," "second," etc., are used for descriptive purposes only and do not imply or suggest any relative importance or indicate the quantity of technical features indicated.

The foregoing illustrates and describes the basic principles and main features of the present disclosure and its advantages. Those skilled in the art should understand that the present disclosure is not limited to the embodiments described above. The embodiments and descriptions in the specification are intended only to illustrate the principles of the present disclosure. Within the scope and spirit of the present disclosure, various modifications and improvements can be made which fall within the scope of protection defined by the appended claims and their equivalents.

What is claimed is:

1. A garden cart comprising:

a frame provided with a storage space;

a seat portion comprising a first end rotatably connected to the frame; and a second end opposite to the first end, the seat portion configured to rotate to cover the storage space, and a top side of the seat portion defining a seat surface;

a handle portion connected to the second end of the seat portion; and at least two wheels rotatably installed on a bottom of the frame and configured to allow the garden cart to move, wherein in a pushing state, the seat portion covers the storage space and the garden cart is movable in a direction from the second end to the first end when the garden cart is pushed;

the seat portion further comprises a seat frame configured to support the seat portion and a cushion configured for seating; the seat frame comprises an outer frame and a plurality of rods connected to opposite inner sides of the outer frame at intervals; the cushion is detachably connected to the seat frame and covers the plurality of rods; and a hardness of the seat frame is greater than a hardness of the cushion;

the seat frame defines an accommodating space, a portion of the handle portion is retractably received in the accommodating space; when the seat portion is placed on the frame and the handle portion is in a retracted state in the accommodating space, along a vertical direction, a projection of the handle portion is outside that of the frame for ease of handling.

2. The garden cart according to claim 1, wherein in a pulling state, the seat portion is rotated to an acute angle defined between the seat portion and a ground.

3. The garden cart according to claim 1, wherein a first groove is defined on a side of the frame close to the first end, the first groove is configured to receive the first end, when the seat portion is rotated to a plane paralleled to a ground and the storage space is uncovered by the seat portion, and a bottom wall of the first groove resists against the first end.

4. The garden cart according to claim 3, wherein a second groove is defined on a side of the frame close to the second end, the second groove is configured to receive the second end, when the seat portion is placed on the frame, a bottom wall of the second groove resists against the first end.

5. A garden cart comprising:

a frame provided with a storage space;

a seat portion comprising a first end rotatably connected to the frame; and a second end opposite to the first end, the seat portion configured to rotate to cover the storage space, and a top side of the seat portion defining a seat surface;

a handle portion connected to the second end of the seat portion; and at least two wheels rotatably installed on a bottom of the frame and configured to allow the garden cart to move, wherein in a pushing state, the seat portion covers the storage space and the garden cart is movable in a direction from the second end to the first end when the garden cart is pushed;

wherein the seat portion further comprising a seat frame configured to support the seat portion and a cushion configured for seating, the cushion is connected to the seat frame, and a hardness of the seat frame is more than a hardness of the cushion;

wherein the cushion includes a first layer, a second layer and a third layer each detachably connected to the seat frame, the third layer, the first layer and the second layer are stacked one by one and arranged on the seat frame, when the first layer and the third layer are detached from the seat frame, the second layer and the seat frame cover the storage space, the first layer and the third layer are co-planar with the second layer, a side of the first layer away from the frame, a side of the second layer away from the frame and a side of the third layer away from the frame cooperatively form a first platform.

6. A garden cart comprising:

a frame provided with a storage space;

a seat portion comprising a first end rotatably connected to the frame; and a second end opposite to the first end, the seat portion configured to rotate to cover the storage space, and a top side of the seat portion defining a seat surface;

a handle portion connected to the second end of the seat portion; and at least two wheels rotatably installed on a bottom of the frame and configured to allow the garden cart to move, wherein in a pushing state, the seat portion covers the storage space and the garden cart is movable in a direction from the second end to the first end when the garden cart is pushed;

wherein the seat portion further comprising a seat frame configured to support the seat portion and a cushion configured for seating, the cushion is connected to the seat frame, and a hardness of the seat frame is more than a hardness of the cushion;

wherein the cushion includes a first layer and a second layer each detachably connected to the seat frame, the first layer and the second layer are stacked one by one and arranged on the seat frame, when the second layer is detached from the seat frame, each of the first layer and the seat frame is rotated 180 degrees to be parallel to the ground and the frame supports the first end, the second layer is arranged on the frame and is co-planar with the first layer, a side of the first layer away from the frame and a side the second layer away from the frame cooperative form a first platform.

* * * * *